United States Patent

Imashiro et al.

[11] Patent Number: 5,973,024
[45] Date of Patent: Oct. 26, 1999

[54] METHOD FOR CONTROL OF BIODEGRADATION RATE OF BIODEGRADABLE PLASTIC

[75] Inventors: Yasuo Imashiro; Ikuo Takahashi; Naofumi Horie; Shigekazu Suzuki, all of Tokyo, Japan

[73] Assignee: Nisshinbo Industries, Inc., Tokyo, Japan

[21] Appl. No.: 09/098,717

[22] Filed: Jun. 17, 1998

[30] Foreign Application Priority Data

Jul. 9, 1997 [JP] Japan ................................ 9-200803

[51] Int. Cl.⁶ .................................................... C08K 5/29
[52] U.S. Cl. ........................... 523/124; 523/125; 524/195
[58] Field of Search .................................. 523/124, 125; 524/195

[56] References Cited

U.S. PATENT DOCUMENTS 5,807,973  9/1998  Gruber et al. ............................ 528/354

Primary Examiner—Edward J. Cain
Attorney, Agent, or Firm—Kubovcik & Kubovcik

[57] ABSTRACT

The present invention provides a biodegradable plastic composition obtained by adding a carbodiimide compound to a biodegradable plastic, and a method for control of biodegradation rate of biodegradable plastic, which comprises adding a carbodiimide compound to a biodegradable plastic. According to the present invention, the biodegradation rate of biodegradable plastic can be controlled stably.

2 Claims, No Drawings

METHOD FOR CONTROL OF BIODEGRADATION RATE OF BIODEGRADABLE PLASTIC

BACKGROUND OF THE INVENTION (1) Field of the Invention

The present invention relates to a biodegradable plastic composition and a method for control of biodegradation rate of biodegradable plastic. More particularly, the present invention relates to a biodegradable plastic composition wherein a carbodiimide compound is added to a biodegradable plastic to control the biodegradation rate of the plastic, and a method for control of biodegradation rate of biodegradable plastic.

(2) Description of the Prior Art

In recent years, environmental pollution caused by plastic waste has become a bigger problem. Meanwhile, the necessity for and significance of environmental protection has become more important. Under such circumstances, research and development on biodegradable plastics is under way.

Biodegradable plastics can be largely divided into three kinds; that is, a plastic whose molecular skeleton is an aliphatic polyester resin, a plastic whose molecular skeleton is a polyvinyl alcohol, and a plastic whose molecular skeleton is a polysaccharide. Of these plastics, an aliphatic polyester resin has found no practical application as a biodegradable plastic because it generally has a low melting point, is inferior in thermal stability when produced, and has no sufficiently large molecular weight and is unable to give a practical molding having satisfactory properties. However, researches were made to eliminate these problems; as a result, a high-molecular aliphatic polyester resin was developed and is finding applications, for example, as materials for agriculture, forestry and fishery (e.g. films, pots for plant cultivation, fishing line and fishing net), materials for civil engineering (e.g. sheets for water retention, vegetation nets and sand bags) and materials for packaging or containers (those to which earth, food or the like sticks easily and which are difficult to reuse).

Biodegradable plastics such as the above aliphatic polyester resins and the like are needed to satisfy the following requirements.

(1) When in use, they show properties (e.g. strength, water resistance, moldability and heat resistance) similar to those of conventional plastics.

(2) When disposed as a waste, they are quickly degraded by microbes widely living in nature.

For the above reason, several proposals were made on the control of biodegradation rate of biodegradable plastic. Of them, known are, for example, a proposal which comprises adding a hydrolysis enzyme to a biodegradable plastic to shorten the biodegradation time of the plastic [Japanese Patent Application Kokai (Laid-Open) No. 168149/1992] and a proposal which comprises reducing the content of unreacted monomer(s), impurities, chain type or ring type oligomer(s), etc. in biodegradable plastic to extend the biodegradation time of the plastic [Japanese Patent Application Kokai (Laid-Open) No. 12688/1997].

Biodegradable plastics according to the above conventional techniques, however, still have problems such as the following and their biodegradability is not yet controlled at a satisfactory level.

(a) In producing the raw material(s) of biodegradable plastic in the form of pellets or producing a biodegradable plastic from the pellets, they are exposed to the moisture present in the atmosphere or are heated; thereby, hydrolysis proceeds in the biodegradable plastic and the initial properties of the molded product of the biodegradable plastic are deteriorated or fluctuate.

(b) The biodegradability of the product is unstable.

SUMMARY OF THE INVENTION

Objects of the present invention are to alleviate the problems of the prior art and provide (1) a biodegradable plastic composition having a stable biodegradation rate and (2) a method for control of biodegradation rate of a biodegradable plastic.

The present inventors made a study in order to develop a plastic composition having good biodegradability. As a result, the present inventors found out that a biodegradable plastic composition obtained by adding, to a biodegradable plastic, a carbodiimide compound having at least one carbodiimide group in the molecule (the compound includes a polycarbodiimide) shows improved hydrolysis resistance and that the hydrolysis resistance of such a composition can be controlled by proper selection of the kind and/or amount of the carbodiimide compound used. Based on the above finding, the present inventors considered that addition of a carbodiimide compound to a biodegradable plastic having biodegradability caused by hydrolysis might enable control of the biodegradation rate of the plastic. The above finding and consideration has led to the completion of the present invention.

The present invention provides:

a biodegradable plastic composition obtained by adding a carbodiimide compound to a biodegradable plastic, and a method for control of biodegradation rate of biodegradable plastic, which comprises adding a carbodiimide compound to a biodegradable plastic.

DETAILED DESCRIPTION OF THE INVENTION

The present invention is hereinafter described in detail.

The biodegradable plastic used in the present invention includes, for example, a polyester resin which can be metabolized by microbes, particularly an aliphatic polyester resin which is easily metabolized by microbes.

The aliphatic polyester resin firstly includes an aliphatic glycol/polybasic acid polyester resin obtained by reacting an aliphatic glycol with an aliphatic polybasic acid (or a anhydride thereof) in the presence of a catalyst, or a high-molecular aliphatic glycol/polybasic acid polyester resin obtained by conducting the above reaction using, as necessary, a small amount of a coupling agent.

The aliphatic glycol used in production of the biodegradable plastic (aliphatic glycol/polybasic acid polyester resin) used in the present invention includes, for example, ethylene glycol, 1,4-butanediol, 1,6-hexanediol, decamethylene glycol, neopentyl glycol and 1,4-cyclohexanedimethanol. Ethylene oxide is also usable. These glycols can be used singly or in combination of two or more kinds thereof.

As the aliphatic polybasic acid or anhydride thereof to be reacted with the aliphatic glycol for production of the biodegradable plastic (aliphatic glycol/polybasic acid polyester resin), there can be used those commercially available, such as succinic acid, adipic acid, suberic acid, sebacic acid, dodecanoic acid, succinic anhydride, adipic anhydride and the like. These polybasic acids and/or anhydrides thereof can be used singly or in combination of two or more kinds thereof.

The above glycol and polybasic acid are both aliphatic. Small amounts of other components such as aromatic glycol and aromatic polybasic acid (e.g. trimellitic anhydride or pyromellitic anhydride) can be used together. Since use of such an aromatic component(s) results in deteriorated biodegradability, the amounts of the aromatic glycol and aromatic polybasic acid used are required to be 20 parts by weight or less, preferably 10 parts by weight or less, more preferably 5 parts by weight or less per 100 parts by weight of the aliphatic glycol.

The catalyst used in production of the aliphatic glycol/polybasic acid polyester resin can be exemplified by organic acid salts, alkoxides and oxides of metals such as titanium, tin, antimony, cerium, zinc, cobalt, iron, lead, manganese, aluminum, magnesium, germanium and the like. Of these, preferred are tin or aluminum compounds.

In producing the aliphatic glycol/polybasic acid polyester resin, equivalent amounts of an aliphatic glycol and an aliphatic polybasic acid are reacted with heating, in the presence of a catalyst using, as necessary, a solvent suitable for the raw materials. By controlling the proceeding of the reaction, a prepolymer of low polymerization degree can be produced.

In the above production of the aliphatic glycol/polybasic acid polyester resin, a coupling agent can be added to a prepolymer of low polymerization degree in order to obtain a polymer of higher number-average molecular weight. The coupling agent includes, for example, a diisocyanate, oxazoline, a diepoxy compound and an acid anhydride. A diisocyanate is particularly preferred.

As to the kind of the diisocyanate used as a coupling agent, there is no particular restriction, and the diisocyanate includes, for example, 2,4-tolylene diisocyanate, a mixture of 2,4-tolylene diisocyanate and 2,6-tolylene diisocyanate, diphenylmethane diisocyanate, 1,5-naphthalene diisocyanate, xylylene diisocyanate, hydrogenated xylylene diisocyanate, hexamethylene diisocyanate, isophorone diisocyanate and 4,4'-dicyclohexylmethane diisocyanate. Of these, hexamethylene diisocyanate is particularly preferred in view of the color of the aliphatic glycol/polybasic acid polyester resin obtained, the reactivity when added to a prepolymer of low polymerization degree, etc.

The amount of the coupling agent used is, for example, 0.1 to 5 parts by weight, preferably 0.5 to 3 parts by weight per 100 parts by weight of the prepolymer. When the amount is less than 0.1 part by weight, insufficient coupling takes place. When the amount is more than 5 parts by weight, gelation tends to occur.

In the aliphatic glycol/polybasic acid polyester resin, the terminal hydroxyl group may be blocked by other compounds via a double bond, a urethane bond, a urea bond or the like. Or, the aliphatic glycol/polybasic acid polyester resin may have been modified.

The aliphatic polyester resin secondly includes a polylactic acid type aliphatic polyester resin. It is specifically a polymer or copolymer of an oxyacid such as lactic acid, malic acid, glycolic acid or the like, particularly a hydroxycarboxylic acid type aliphatic polyester resin typified by polylactic acid.

The polylactic acid type aliphatic polyester resin can be obtained ordinarily by ring-opening polymerization of lactide (which is a cyclic diester) and corresponding lactone, i.e. a lactide process; or, can be obtained by direct dehydration and condensation of lactic acid or by polycondensation of formalin and carbon dioxide.

The catalyst used in production of the polylactic acid aliphatic polyester resin can be exemplified by compounds of tin, antimony, zinc, titanium, iron or aluminum. Of these, tin-based catalysts and an aluminum-based catalysts are preferred with tin octylate and aluminum acetylacetonate being particularly preferred.

As the polylactic acid type aliphatic polyester resin, there is preferred a poly(L-lactic acid) obtained by ring-opening polymerization of lactide because it becomes L-lactic acid upon hydrolysis and moreover its safety is confirmed. However, the polylactic acid type aliphatic polyester resin used in the present invention is not restricted thereto. Therefore, the raw material lactide used for production of the polyester resin is not restricted to L-lactic acid alone.

The carbodiimide compound having at least one carbodiimide group in the molecule (the carbodiimide compound includes a polycarbodiimide compound), used in the present invention can be a carbodiimide compound produced by a well-known method. It can be, for example, a carbodiimide compound produced by subjecting a polyisocyanate to decarboxylation condensation using a catalyst (an organic phosphorus compound or an organometal compound) in a solventless state or in an inert solvent at a temperature of about 70° C. or higher.

The monocarbodiimide compound as the carbodiimide compound used in the present invention can be exemplified by dicyclohexylcarbodiimide, diisopropylcarbodiimide, dimethylcarbodiimide, diisobutylcarbodiimide, dioctylcarbodiimide, tert-butylisopropylcarbodiimide, diphenylcarbodiimide, di-tert-butylcarbodiimide and di-β-naphthylcarbodiimide. Of these, preferred are dicyclohexylcarbodiimide and diisopropylcarbodiimide in view of the commercial availability, in particular.

The polycarbodiimide compound as the carbodiimide compound used in the present invention can be a polycarbodiimide produced by one of various processes. It can basically be a polycarbodiimide produced by conventional processes for polycarbodiimide production [U.S. Pat. No. 2941956; Japanese Patent Publication No. 33279/1972; J. Org. Chem. 28, 2069–2075 (1963); Chemical Review 1981, Vol. 81 No. 4, pp. 619–621].

The organic diisocyanate which is a raw material in production of the polycarbodiimide compound, includes, for example, aromatic diisocyanates, aliphatic diisocyanates, alicyclic diisocyanates, and mixtures thereof. Specific examples thereof are 1,5-naphthalene diisocyanate, 4,4'-diphenylmethane diisocyanate, 4,4'-diphenyldimethylmethane diisocyanate, 1,3-phenylene diisocyanate, 1,4-phenylene diisocyanate, 2,4-tolylene diisocyanate, 2,6-tolylene diisocyanate, a mixture of 2,4-tolylene diisocyanate and 2,6-tolylene diisocyanate, hexamethylene diisocyanate, cyclohexane-1,4-diisocyanate, xylylene diisocyanate, isophorone diisocyanate, dicyclohexylmethane-4,4'-diisocyanate, methylcyclohexane diisocyanate, tetramethylxylylene diisocyanate, 2,6-diisopropylphenyl isocyanate and 1,3,5-triisopropylbenzene-2,4-diisocyanate.

It is possible to allow the polycarbodiimide compound to have an appropriate polymerization degree, by using a compound (e.g. a monoisocyanate) capable of reacting with the terminal isocyanate of the polycarbodiimide compound.

As the monoisocyanate used for terminal blocking and polymerization degree control of polycarbodiimide compound, there can be mentioned, for example, phenyl isocyanate, tolyl isocyanate, dimethylphenyl isocyanate, cyclohexyl isocyanate, butyl isocyanate and naphthyl isocyanate.

The terminal blocking agent used for polymerization degree control of polycarbodiimide compound is not restricted to the above monoisocyanates and further includes active hydrogen-containing compounds capable of reacting with the terminal isocyanate. Examples thereof are hydroxyl group-containing aliphatic, aromatic or alicyclic compounds (methanol, ethanol, phenol, cyclohexanol, N-methylethanolamine, polyethylene glycol monomethyl ether, polypropylene glycol monomethyl ether); =NH group-containing compounds (diethylamine, dicyclohexylamine); —NH$_2$ group-containing compounds (butylamine, cyclohexylamine); —COOH group-containing compounds (succinic acid, benzoic acid, cyclohexanoic acid); —SH group-containing compounds (ethylmercaptan, allylmercaptan, thiophenol); and epoxy group-containing compounds.

The decarboxylation condensation of the organic diisocyanate is conducted in the presence of an appropriate carbodiimidization catalyst. As the carbodiimidization catalyst, there are preferably used organic phosphorus compounds and organometal compounds represented by the general formula

wherein M is a metal such as Ti, Na, K, V, W, Hf, Zr, Pb, Mn, Ni, Ca, Ba or the like, and R is a $C_{1-20}$ alkyl group or an aryl group. Of the organic phosphorus compounds, phosphorene oxides are preferred and, of the organometal compounds, alkoxides of Ti, Hf or Zr are preferred, for their activities.

Specific examples of the phosphorene oxides are 3-methyl-1-phenyl-2-phosphorene-1-oxide, 3-methyl-1-ethyl-2-phosphorene-1-oxide, 1,3-dimethyl-2-phosphorene-1-oxide, 1-phenyl-2-phosphorene-1-oxide, 1-ethyl-2-phosphorene-1-oxide, 1-methyl-2-phosphorene-1-oxide, and double bond isomers thereof. Of these, particularly preferred is 3-methyl-1-phenyl-2-phosphorene-1-oxide for the commercial availability.

The amount of the carbodiimide compound added to the biodegradable plastic is preferably 0.01 to 10 parts by weight, particularly preferably 0.1 to 5 parts by weight per 100 parts by weight of the biodegradable plastic. When the amount is less than 0.01 part by weight, no effect of control of biodegradation rate is seen. When the amount is more than 10 parts by weight, the properties of the biodegradable plastic may be impaired.

In the present invention, mixing of the carbodiimide compound into the biodegradable plastic can be conducted by dissolving them in an organic solvent and then subjecting the resulting solution to distillation to remove the organic solvent. The organic solvent is desirably an organic solvent which is capable of dissolving the biodegradable plastic and further is non-polymerizable and has no active hydrogen. Specific examples of the organic solvent are chloroform and tetrahydrofuran (THF).

Mixing of the carbodiimide compound into the biodegradable plastic can be conducted by melt-kneading using an extruder, or by mixing the carbodiimide compound into a biodegradable plastic which has been synthesized.

The biodegradation rate of biodegradable plastic can be controlled by the kind and/or amount of the carbodiimide compound added to the plastic. Therefore, the kind and amount of the carbodiimide compound added to the plastic can be determined depending upon the intended properties to be possessed by the product to be produced.

The biodegradable plastic composition of the present invention may further contain, as necessary, a reinforcing agent, an inorganic or organic filler, an oxidation inhibitor, a thermal stabilizer, an ultraviolet absorber, a lubricant, a wax, a coloring agent, a crystallization accelerator, a decomposable organic substance (e.g. starch), etc.

DESCRIPTION OF PREFERRED EMBODIMENTS

The present invention is described in more detail below by way of Examples.

Synthesis Example 1 of Carbodiimide Compound 590 g of 4,4'-dicyclohexylmethane diisocyanate, 62.6 g of cyclohexyl isocyanate and 6.12 g of a carbodiimidization catalyst (3-methyl-1-phenyl-2-phosphorene-1-oxide) were reacted at 180° C. for 48 hours to obtain 4,4'-dicyclohexylmethanecarbodiimide (polymerization degree=10).

Synthesis Example 2 of Carbodiimide Compound 549 g of tetramethylxylylene diisocyanate, 49.5 g of n-butyl isocyanate and 5.99 g of a carbodiimidization catalyst (3-methyl-1-phenyl-2-phosphorene-1-oxide) were reacted at 180° C. for 48 hours to obtain tetramethylxylylenecarbodiimide (polymerization degree=10).

Synthesis Example 3 of Carbodiimide Compound 500 g of 4,4'-dicyclohexylmethane diisocyanate and 5.0 g of a carbodiimidization catalyst (tetrabutyl titanate) were reacted at 180° C. for 12 hours. Then, 40.0 g of polyethylene glycol monomethyl ether was added, and a reaction was allowed to take place for urethanization of terminal isocyanate, to obtain polyethylene glycol terminated 4,4'-dicyclohexylmethane carbodiimide (polymerization degree=5.5).

EXAMPLES 1 TO 3

An aliphatic polyester resin (main component: polybutylene succinate/adipate) as a biodegradable plastic was dry-blended with 1% by weight, based on the polyester resin, of one of the carbodiimide compounds obtained in Synthesis Examples 1 to 3. The resulting blend was kneaded by the use of a twin-screw extruder and extruded through a T die to produce a film having a thickness of 200 μm. The film was subjected to punching to prepare a JIS No. 4 dumbbell specimen. The specimen was placed in a thermo-hygrostat of 50° C. and 90%, and a tensile test (tensile speed: 10 mm/min, distance between fulcrums: 55 mm) was conducted after each given length of time to measure an elongation (%) at break. The results are shown in Table 1.

Comparative Example 1

The same operation as in Example 1 was conducted except that no carbodiimide compound was used. The result are shown in Table 1.

TABLE 1

| | Carbodiimide compound | Test time (hr) | | | | |
|---|---|---|---|---|---|---|
| | | 0 | 150 | 300 | 500 | 750 |
| Example 1 | Syn. Ex. 1 | 820% | 350% | 400% | 400% | 370% |
| Example 2 | Syn. Ex. 2 | 800% | 340% | 340% | 350% | 320% |
| Example 3 | Syn. Ex. 3 | 810% | 360% | 350% | 300% | 200% |
| Comparative Example 1 | Not used | 600% | 30% | 20% | 20% | 10% |

EXAMPLES 4 TO 6

An aliphatic polyester resin (main component: polylactic acid) as a biodegradable plastic was dry-blended with 1% by weight, based on the polyester resin, of one of the carbodiimide compounds obtained in Synthesis Examples 1 to 3. The resulting blend was kneaded by the use of a twin-screw extruder and extruded through a T die to produce a film having a thickness of 200 μm. The film was subjected to punching to prepare a JIS No. 4 dumbbell specimen. The specimen was placed in a thermo-hygrostat of 70° C. and 90%, and a tensile test was conducted after each given length of time to measure a tensile strength at break. The results are shown in Table 2.

Comparative Example 2

The same operation as in Example 4 was conducted except that no carbodiimide compound was used. The results are shown in Table 2. Incidentally, the columns of Table 2 having no figure indicate that the mechanical strength of specimen was too low to conduct the tensile test.

TABLE 2

| | Carbodiimide compound | Test time (hr) | | | | | | | |
|---|---|---|---|---|---|---|---|---|---|
| | | 0 | 50 | 100 | 150 | 200 | 250 | 300 | 350 |
| Example 4 | Syn. Ex. 1 | 6.8 | 7.1 | 7.1 | 6.9 | 6.7 | 6.4 | 6.1 | 2.4 |
| Example 5 | Syn. Ex. 2 | 6.9 | 7.3 | 7.0 | 7.1 | 6.5 | 6.7 | 6.0 | 3.1 |
| Example 6 | Syn. Ex. 3 | 6.7 | 7.3 | 6.8 | 7.0 | 6.3 | 6.5 | 5.1 | 2.1 |
| Comparative Example 2 | Not used | 6.4 | 5.2 | 5.0 | 3.2 | 0.7 | | | |

(Unit: kgf/mm$^2$)

EXAMPLES 7 TO 9

The operation was conducted in the same manner as in Example 1 except that the carbodiimide compound obtained in Synthesis Example 1 was added to the aliphatic polyester resin in an amount of 0.1%, 0.5% or 5% by weight based on the polyester resin. The results are shown in Table 3.

TABLE 3

| | Amount of carbodiimide (wt. %) | Test time (hr) | | | | |
|---|---|---|---|---|---|---|
| | | 0 | 150 | 300 | 500 | 750 |
| Example 7 | 0.1 | 650% | 100% | 30% | 20% | 10% |
| Example 8 | 0.5 | 800% | 350% | 340% | 350% | 250% |
| Example 9 | 5.0 | 780% | 320% | 350% | 360% | 350% |

EXAMPLES 10 TO 12

An aliphatic polyester ester (main component: polylactic acid) as a biodegradable plastic was dry-blended with 0.25% (Example 10), 0.5% (Example 11), 0.75% (Example 12) by weight, based on the polyester resin, of the carbodiimide compound obtained in Synthesis Example 3. The resulting blend was kneaded by the use of a twin-screw extruder and extruded through a T die to produce a film having a thickness of 200 μm. The film was subjected to punching to prepare a JIS No. 4 dumbbell specimen. The specimen was placed in a thermo-hygrostat of 70° C. and 90%, and a tensile test was conducted after each given length of time to measure a tensile strength at break. The results are shown in Table 4. Incidentally, the columns of Table 4 having no figure indicate that the mechanical strength of specimen was too low to conduct the tensile test.

TABLE 4

| | Test time (hr) | | | | | | | |
|---|---|---|---|---|---|---|---|---|
| | 0 | 50 | 100 | 150 | 200 | 250 | 300 | 350 |
| Example 10 | 6.6 | 6.8 | 6.2 | 4.4 | 1.27 | | | |
| Example 11 | 6.87 | 7.1 | 7.0 | 6.8 | 5.6 | 2.4 | | |
| Example 12 | 6.33 | 6.8 | 6.6 | 6.7 | 6.3 | 4.8 | 2.4 | 1.4 |

(Unit: kgf/mm$_2$)

As is clear from Examples, the biodegradable plastic composition according to the present invention, obtained by adding a carbodiimide compound to a biodegradable plastic, as compared with biodegradable plastics containing no carbodiimide compound, is remarkably improved in hydrolysis resistance, i.e. resistance to biodegradation caused by hydrolysis.

Further, the biodegradable plastic composition according to the present invention can have a different hydrolysis resistance, i.e. a different rate of biodegradation caused by hydrolysis, by changing the kind and/or amount of the carbodiimide compound used in the composition.

Thus, in the present invention, by adding a carbodiimide compound to a biodegradable plastic, the rate of biodegradation caused by hydrolysis, of the biodegradable plastic can be reduced; and the degree of the reduction can be controlled by appropriate selection of the kind and amount of the carbodiimide compound.

What is claimed is:

1. A method for control of biodegradation rate of a biodegradable plastic, which comprises adding a carbodiimide compound to a biodegradable plastic, the carbodiimide compound being a monocarbodiimide compound or polycarbodiimide derived from an aliphatic diisocyanate, an alicyclic diisocyanate or a mixture thereof.

2. A method according to claim 1, wherein the amount of the carbodiimide compound added is 0.01 to 10% by weight based on the biodegradable plastic.

* * * * *